Patented Jan. 17, 1950

2,494,559

UNITED STATES PATENT OFFICE 2,494,559

COATING AND IMPREGNATING COMPOSITION

Louis John Jubanowsky, Vauxhall, N. J., assignor to The Baker Castor Oil Company, Jersey City, N. J., a corporation of New Jersey No Drawing. Application August 17, 1948, Serial No. 44,801

11 Claims. (Cl. 106—250)

This invention relates to compositions for coating and impregnating fibrous, granular and other materials to render them resistant to the solvent action of mineral oils, aromatic hydrocarbons and other hydrocarbon materials. This is a continuation-in-part of my application Serial No. 547,519, filed July 31, 1944, now Patent No. 2,447,506 of August 24, 1948.

One of the objects of this invention is to provide compositions for treating fibrous materials, such as leather, asbestos, paper, and also porous materials so as to cause them to be substantially impervious to and unaffected by mineral oils, aromatic hydrocarbons and the like. Another object of the invention is to modify the compositions for treating fibrous and other materials so that the treated materials are suitably pliable and flexible for use in a variety of applications. A further object is to provide compositions which have valuable lubricating properties for various applications. These compositions also impart water-proofness to materials that are coated or impregnated with them. Other objects and advantages will hereinafter appear.

The product of this invention is a fusible impregnating and coating composition, which is a blend of two components. The first component is a substantially saturated monohydric alcohol ester of a fatty acid, which ester contains an oxygen atom in its molecular structure other than those present in the ester linkage, said ester having a melting point of at least about 50° C. The second component is a non-hydrogenated air blown polyhydric alcohol ester of unsaturated fatty acids.

When fibrous materials have been properly shaped and compacted for use as gaskets, packing, and the like, it is important that such fibrous materials be impervious to and unaffected by mineral oils and other hydrocarbons to which they may be exposed during use. It has now been discovered that a particularly beneficial class of compounds for treating and impregnating fibrous materials is the solid saturated esters of fatty acids and monohydric alcohols which contain oxygen atoms in their molecular structure other than those present in the ester linkage thereof. Thus, these compounds should contain one or more of such groups as the following: hydroxyl, carbonyl, alkoxy and aryloxy. "Carbonyl" includes both ketonic and aldehydic groups. Hydrocarbon insolubility of the compounds of the present invention increases with increasing numbers of oxygen atoms per molecule, but compounds containing only one oxygen atom per fatty acid radical in addition to those present in the carboxyl radical have been found to be quite suitable for accomplishing the objects of this invention. It is preferable that solids, i.e., compositions which are solid at room temperature, be used for the treatment of fibrous materials as in this way the treatment is rendered more permanent than if the treatment were to be carried out with liquid agents. Consequently, it is preferred to use solids of the class of compounds described which melt above approximately 50° C. These solids are waxy in character, which is an added advantage when it is desired that the treated fibrous material have lubricating properties as in cases where the fibrous material is used in contact with moving parts, in machinery, for packing glands, or the like. For convenience this group of compounds will be designated as impregnants.

These impregnants are saturated esters of fatty acids and monohydric alcohols, and contain oxygen atoms in their molecules in addition to those present in the ester linkage thereof. In the monohydric alcohol esters of this invention, the additional oxygen atom or atoms are present in the form of hydroxyl or carbonyl groups or ethereal linkages, which may be part of the fatty acid radical.

The fatty acids used in forming the esters of this invention should contain more than ten carbon atoms per molecule so that the esters are solids that melt above 50° C. Fatty acids found in natural sources, as in vegetable oils, which have straight carbon chains, as well as synthetic branched-chain fatty acids may also be components of the esters used in carrying out this invention. The fatty acid radicals may also have such substituents therein as halogen, amino, substituted amino, sulfonic acid, sulfate, phosphonic acid, cyanide, borate groups and the like. For example, fatty acids such as oleic, palmitic, lauric, arachidic, melissic, and erucic acids, as well as fatty acids obtained by hydrolysis of vegetable oils, may be readily utilized in forming the impregnants of this invention, after said acids have been treated to cause the introduction therein of appropriate substituents as mentioned. Examples of fatty acids having appropriate oxygen-containing substituents are 12-hydroxystearic, linusic, stearoxylic, 12-methoxystearic, and formyl palmitic acids. Fischer-Tropsch branched-chain, synthetic fatty acids may also be used in forming the impregnants of this invention.

Various monohydric alcohols may be used as constituents of the esters of this invention. As in the case of the fatty acids, the monohydric alcohols may have various substituent groups, including groups containing additional oxygen substituents (other than hydroxyl groups). Examples of suitable monohydric alcohols are; methyl alcohol, ethyl alcohol, heptyl alcohol, octadecyl alcohol, monomethyl ether of ethylene glycol, monobutyl ether of diethylene glycol, monobenzyl ether of ethylene glycol, methyl acetonyl carbinol, acetopropyl alcohol, diacetone alcohol, aldol, pentaldol, isovaleraldol, and the like. As is evident from this listing of some of the suitable alcohols, monohydric alcohols containing oxygen atoms in their molecular structure other than that present in the hydroxyl group may be used to form the saturated ester impregnants of this invention.

Esters derived from naturally occurring esters may be treated and utilized to form the impregnants according to this invention. For example, castor oil may be hydrogenated to yield 12-hydroxy stearin, which is a saturated, waxy solid melting at 80–86° C.; hydrolysis of this glyceride and re-esterification of the resulting 12-hydroxystearic acid with, e. g., methyl alcohol yields a product which is well suited as the impregnant or coating material. It is preferable that the castor oil be completely saturated before hydrolysis and re-esterification, but the iodine number of the hydrogenated castor oil and of similar products may permissibly range up to a value of approximately 10. The castor oil should be hydrogenated selectively, so that the hydroxyl group initially present is not affected.

Other vegetable oils which do not yield, after hydrolysis and re-esterification, suitable impregnants in accordance with this invention may be treated so as to yield satisfactory products. Such oils are first subjected to oxidation, such as air-blowing or catalytic oxidation, or the like, so as to introduce oxygen-containing groups into the fatty acid portions of the vegetable oil molecules. Hydrogenation of the oxidized materials may then follow, if required to remove any remaining unsaturation. Such treatment is not limited to any particular vegetable oil, but may be applied to such oils as dehydrated castor oil, tung oil, linseed oil, soybean oil, cottonseed oil, olive oil, palm kernel oil, and similar oils. Other methods for introducing oxygen-containing groups into the fatty acids which are components of the monohydric alcohol ester impregnants of this invention may be utilized, such as halogenation followed by substitution of oxygen-containing groups for the halogen atoms, addition of compounds having oxygen-containing groups at unsaturated linkages of the fatty acids, and other known methods.

Further methods of producing the saturated, monohydric alcohol ester impregnants of this invention are as follows: selecting fats and oils which have oxygen-containing groups attached to the chains of the fatty acid components of said fats and oils, selectively hydrogenating said fats and oils to remove any unsaturation and subjecting the hydrogenated materials to an ester interchange reaction with a monohydric alcohol, in the presence of proper catalysts and under satisfactory reaction conditions; treating polyhydric alcohol esters of synthetic fatty acids according to any of the foregoing procedures; and forming a monohydric alcohol ester of a fatty acid, treating same to cause oxygen addition in the fatty acid chain, and selectively hydrogenating the resulting ester to remove any unsaturation.

The saturated esters of monohydric alcohols which are useful in this invention are solid at room temperature and do not melt below 50° C. Examples of such esters, together with their melting points are:

| | °C. |
|---|---|
| Methyl ester of jalapinolic (d-11-OH-hexadecanoic) acid | 51 |
| Methyl ester of 11-OH palmitic acid | 50 |
| Ethyl ester of 2-OH stearic acid | 63 |
| Methyl ester of 12-OH stearic acid | 57 |
| Ethyl ester of 12-OH stearic acid | 51.6 |
| Decyl ester of 12-OH stearic acid | 57.2 |
| Dodecyl ester of 12-OH stearic acid | 61.5 |
| Tetradecyl ester of 12-OH stearic acid | 64.0 |
| Hexadecyl ester of 12-OH stearic acid | 69.5 |
| Octadecyl ester of 12-OH stearic acid | 76.5 |
| Methyl ester of 2-OH arachidic acid | 64 |
| Ethyl ester of 2-OH arachidic acid | 63 |
| Ethyl ester of 2-OH behenic acid | 71 |
| Ester of benzyl ether of ethylene glycol with 12-OH stearic acid | 73–77 |
| Methyl ester of 9,10-di-OH stearic acid | 110 |
| Ethyl ester of 9,10-di-OH stearic acid | 106 |
| Propyl ester of 9,10-di-OH stearic acid | 100.6 |
| Butyl ester of 9,10-di-OH stearic acid | 93 |
| Amyl ester of 9,10-di-OH stearic acid | 93.7 |
| Hexyl ester of 9,10-di-OH stearic acid | 92.2 |
| Heptyl ester of 9,10-di-OH stearic acid | 94.3 |
| Octyl ester of 9,10-di-OH stearic acid | 93.4 |
| Nonyl ester of 9,10-di-OH stearic acid | 95.4 |
| Decyl ester of 9,10-di-OH stearic acid | 94.9 |
| Dodecyl ester of 9,10-di-OH stearic acid | 95.6 |
| Tetradecyl ester of 9,10-di-OH stearic acid | 96.6 |
| Hexadecyl ester of 9,10-di-OH stearic acid | 97.4 |
| Octadecyl ester of 9,10-di-OH stearic acid | 98.2 |
| Tetrahydrofurfuryl ester of 9,10-di-OH stearic acid | 60 |
| Methyl ester of stearoxylic acid | 55 |

The impregnants made in accordance with this invention are not particularly flexible at ordinary or reduced temperatures such as may be encountered in the stratosphere (by airplanes) or in the arctic regions. Consequently, in carrying out this invention, modifiers are incorporated in the impregnants prior to applying the latter to fibrous or other materials. By using the modifiers, the flexibility of the impregnants is improved so that materials treated with them remain impervious to hydrocarbons under varied conditions of use where stresses due to flexing, compression, and tension occur. The modifiers that are used are not affected by exposure to or contact with hydrocarbons, and they also increase the resistance of the impregnants to hydrocarbons.

The modifiers of this invention are produced by air-blowing unsaturated esters of fatty acids and polyhydric alcohols having at least three hydroxyl groups per molecule. The unsaturated linkage of the esters may be present in the polyhydric alcohol portion of the molecule, in the fatty acid portion of the molecule, or in both portions. The fatty acids should have at least six carbon atoms per molecule, and may be straight-or branched-chained. Suitable unsaturated fatty acids include sorbic, geranic, caproleic, undecylenic, lauroleic, myristoleic, palmitoleic, oleic, ricinoleic, linoleic, linolenic, elaeostearic, 4-keto-elaeostearic, clupanodonic, stearolic, gadoleic, arachidonic, erucic, and the like acids. Typical polyhydric alcohols which may be used in forming the modifiers of this invention are glycerin, polyglycerol, pentaerythritol, polypentaerythritol, sorbitol, mannitol, arabinose, glucose, fructose, hexahydroxycyclohexane, and quebrachitol. Glycerine is the most commonly used polyhydric alcohol, since it occurs in vegetable oils. The latter and animal oils come within the category of esters which may be treated by air-blowing for the production of the modifiers of this invention. Typical unsaturated vegetable oils which may be utilized in this connection are castor, tung, safflower, soybean, corn, and olive oils.

The unsaturated esters are treated for producing the modifiers of this invention by passing air through them at a somewhat elevated temperature in the range from about 100° to about 175° C. The preferred modifiers, obtained by this blowing procedure, have, at room temperature, a semi-rubbery, gel-like structure. For example, in the case of blown castor oil, the gel may remain solid up to a temperature of approximately 100° C. When the air-blowing is not carried far enough to produce a solid gel, the products of the air-blowing are viscous oily liquids, which may also be used for modifying the impregnants. However, as indicated, it is preferable to use the more solid modifiers for the purpose of this invention, as such solid products are more highly resistant to hydrocarbons than are the liquid products of air-blowing.

The modifiers of this invention are preferably mixed with the impregnants to the extent of 5% to 50% by weight, based on the total mixture. Less than 5% of modifier may be used, but the desirable effects are not as pronounced as when at least 5% of the modifier is used. When more than 50% of modifier is used, the dry and waxy character of the impregnants of the invention may be lost.

The mixing of the impregnant and its modifier is preferably effected by melting the impregnant and adding the modifier to the melt. Heating and stirring are continued at an elevated temperature until homogeneity is attained. When the finished material is cool it is suitable for treating and impregnating fibrous and other materials.

Properties of the impregnating materials may be altered to suit the needs of particular applications of the impregnating materials. For example, the impregnants may contain halogen in their molecular structure. Such halogen-containing impregnants are useful for imparting flame-proofing properties to treated fibrous materials. When it is desirable to increase the lubricating properties of the finished composition, this may be done by including such substances as graphite and talc in the final impregnating composition. Other inert fillers such as wood flour and kieselguhr may be added to the composition when it is desired to give more body to the composition or more weight to the treated fibrous material.

A further addition may be made to the impregnating composition, namely, the heavy metal soaps of the higher fatty acids. Such soaps as those of calcium, aluminum, zinc, and lead may be used. These soaps have the property of improving the water repellent properties of the finished impregnating composition. Other sorts of addition agents may be used with the impregnating compositions, their choice depending upon the particular effects desired.

All types of fibrous materials may be treated and impregnated by means of the impregnating compositions of this invention. Such fibrous materials include leather, paper, canvas, cotton, kapok, asbestos, rayon, hemp, flax, wood and others. The fibers may be treated while loose and non-compacted, or after fabrication of the finished fibrous article or shape. The fibers may advantageously be freed of moisture by any of the known methods, as by the use of heat, vacuum, or the like, before the impregnation treatment. Or the fibrous materials may be treated with the impregnating compositions in the form of emulsions prepared by known methods. Also, the impregnating compositions may be utilized in the form of their solutions in oxygenated organic solvents.

The compositions of this invention may be used for treating other than fibrous materials; in fact, any materials, including granular, porous, and nonporous materials, such as objects made of synthetic or natural rubbers or plastics, may be treated with such compositions. These compositions, whether applied as impregnants or as protective coatings, will render objects impregnated or coated therewith resistant to the action of hydrocarbons.

The choice of impregnation method will depend on the particular circumstances in each instance. In most cases, any of the generally known methods may be used for this purpose. For example, the fibrous material may be dipped into the molten impregnating composition followed by cooling of the treated material; or the fibrous material may be placed in a suitable chamber, vacuum applied to the chamber, the impregnating composition introduced at an appropriate temperature, and then pressure applied to the chamber. The vacuum serves to remove air and moisture from the fibrous material, while the application of pressure to the impregnating composition forces the composition into the interstices of the fabric in a positive manner. When the fibrous material is in sheeted form the sheets may be fed through hot rolls from which the impregnating composition is fed to the sheets. Other methods for impregnating the fibrous material may be used.

Fibrous materials treated with the impregnating compositions described herein may be used for many purposes. They are useful when it is important that such material is to resist the action of hydrocarbons such as naphtha, gasoline, mineral lubricating oils and greases, aromatic hydrocarbons, hydrocarbon pitches and asphalts, and the like. Among uses for which the impregnating compositions of this invention are particularly suited may be mentioned impregnation of gaskets made of fibrous materials such as leather, asbestos, paper, and the like; shingles and tile made of fibrous material such as asbestos; packing such as is used in stuffing boxes; fibrous material for use as liners in gasoline hose, self-sealing gasoline tanks, and the like; sole leather for shoes used by workers in machine shops, petroleum refineries, gasoline service stations, and the like; paper to be used as a lubricating interliner for leaf springs in various types of vehicles, as an interliner between the soles of shoes to prevent squeaking and hydrocarbon penetration; cotton and similar fabrics used for making work overalls; and fibrous materials to be used in similar and other types of applications. The compositions of this invention may also be utilized for rendering fibrous articles, such as leather goods, soft and pliable, and as compounding ingredients of wax compositions and polishes where it is desired to increase the hydrocarbon resistance of such products. Other uses will be apparent from the properties of the impregnating compositions of this invention.

Examples will now be given of the methods of compounding the impregnating compositions described herein. It will be understood that the invention is not restricted to the particular proportions or details related below. Parts given are by weight.

*Example 1.*—85 parts of methyl 12-hydroxystearate were heated to 150° C. in an open container, and 15 parts of solid blown castor oil, produced by air-blowing of castor oil at approximately 150° C., were then added. The mixture was stirred until homogeneous. When allowed to cool, the product solidified to a soft, wax-like solid. This product is useful for the impregnation of fibrous materials to render them hydrocarbon resistant, being insoluble in gasoline, mineral spirits, cyclohexane, and the other hydrocarbon materials mentioned ante.

*Example 2.*—70 parts of octadecyl 12-hydroxystearate were heated to 150° C. in an open vessel. 30 parts of solid blown castor oil, produced by air-blowing of castor oil at approximately 110° C., were added. The mixture was stirred until it was homogeneous. When cool, the product was similar in appearance and applicability to the product of Example 1. It has been found that, the lower the temperature at which the air-blowing of castor oil and other unsaturated esters is carried out, the greater is the insolubility of the resulting products in hydrocarbons. Thus, in the case of castor oil, most satisfactory results are obtained when the air-blowing is effected at a temperature in the range from about 90° to about 110° C.

*Example 3.*—75 parts of the ester of the benzyl ether of ethylene glycol with 12-hydroxystearic acid were heated to approximately 150° C. in an open container. 20 parts of the solid blown ester of 4-ketoelaeostearic acid (the principal acid component of oiticica oil) and pentaerythritol, produced similarly to the blown oils of Examples 1 and 2, were added. Stirring and heating of the mixture were continued until a clear melt was obtained. The product obtained on cooling was a waxy, light-colored solid, which was quite suitable for impregnating fibrous materials, such as leather, asbestos fabric, gasket fabric, and paper, in accordance with this invention.

*Example 4.*—95 parts of ethyl 2-hydroxybehenate were heated to 140° C. in an open container. 5 parts of the blown polypentaerythritol (Trojan Powder Co. polyhydric alcohol having a 34–36% hydroxyl content) ester of sorbic acid were added, and the mixture was stirred and heated until homogeneous. On cooling, a light-colored waxy solid was formed, which was suitable for use as an impregnating and coating composition.

*Example 5.*—A flexible impregnating and coating composition, impervious to attack by hydrocarbon materials, was prepared, in the manner of the previous examples, from 90 parts of heptyl 9,10-dihydroxystearate and 15 parts of a heavily blown, highly viscous sorbitol tetra-undecylenate.

*Example 6.*—A waxy impregnating and coating composition, impervious to attack by hydrocarbon materials, was prepared, in the manner of the preceding examples, from 100 parts of tetrahydrofurfuryl 9,10-dihydroxystearate and 7.5 parts of the solid blown tetra-ester of hexahydroxycyclohexane and stearolic acid.

*Example 7.*—A flexible impregnating and coating composition, impervious to attack by hydrocarbon materials, was prepared, in the manner of the previous examples, from 65 parts of methyl stearoxylate and 35 parts of the solid blown triester of glucose and erucic acid.

*Example 8.*—85 parts of methyl 12-hydroxystearate were heated to 145° C. in an open container. 12 parts of solid blown soybean oil, produced by air-blowing of soybean oil at approximately 115° C., were then added, along with 3 parts of lead ricinoleate. The mixture was stirred until it was homogeneous. When cooled it was a light brown solid, which was somewhat more waxlike in appearance and feel than the composition of Example 1. The proportions of ingredients used in this example may be varied. For instance, it has been found that quite satisfactory results are produced by incorporating as much as 20% of heavy metal salts such as lead ricinoleate in the impregnating compositions.

Many variations of the compositions illustrated by the examples will be apparent, and the claims are not limited to the specific compositions set forth in the examples.

What is claimed is:

1. A fusible impregnating and coating composition which is substantially solid at room temperature and which is resistant to the solvent action of hydrocarbons, which comprises a blend of a solid, substantially saturated ester of a fatty acid having more than 10 carbon atoms per molecule and a monohydric alcohol, which ester contains an oxygen atom in its molecular structure other than those present in the ester linkage and which melts above about 50° C., and has an iodine number of less than about 10, and 5 to 50% by weight, based on the total mixture, of a non-hydrogenated airblown unsaturated ester of a polyhydric alcohol having at least three hydroxyl groups per molecule and an unsaturated fatty acid having at least six carbon atoms per molecule.

2. The composition of claim 1, in which the non-hydrogenated air-blown unsaturated polyhydric alcohol ester contains an oxygen atom in its molecular structure other than those present in the ester linkages.

3. A fusible impregnating and coating composition which is substantially solid at room temperature and which is resistant to the solvent action of hydrocarbons, which comprises a blend of a solid, hydroxyl-containing, substantially saturated ester of a fatty acid having more than 10 carbon atoms per molecule and a monohydric alcohol which ester melts above about 50° C., and has an iodine number of less than about 10, and 5 to 50% by weight, based on the total mixture, of a non-hydrogenated, air-blown unsaturated ester of a polyhydric alcohol having at least three hydroxyl groups per molecule and an unsaturated fatty acid having at least six carbon atoms per molecule.

4. The composition of claim 1, in which the fatty acid of said substantially saturated ester is a vegetable oil fatty acid.

5. The composition of claim 3, in which the fatty acid of said substantially saturated ester is a hydroxyl-containing vegetable oil fatty acid.

6. A fusible impregnating and coating composition which is substantially solid at room temperature and which is resistant to the solvent action of hydrocarbons, which comprises a blend of a solid, hydroxyl-containing, substantially saturated ester of a fatty acid having more than 10 carbon atoms per molecule and monohydric alcohol, which ester melts above about 50° C., and has an iodine number of less than about 10, and 5 to 50% by weight, based on the total mixture, of a non-hydrogenated, air-blown unsaturated vegetable oil.

7. The composition of claim 6, in which the fatty acid of said substantially saturated ester is a hydroxyl-containing vegetable oil fatty acid.

8. The composition of claim 1, in which said substantially saturated fatty acid ester is prepared by the oxidation of the corresponding unsaturated vegetable oil fatty acid ester having oxygen atoms present only in its ester linkage and the subsequent hydrogenation of said oxidized ester.

9. A fusible impregnating and coating composition which is substantially solid at room temperature and which is resistant to the solvent action of hydrocarbons, which comprises a blend of methyl 12-hydroxystearate and 5 to 50% by weight, based on the total mixture, of a non-hydrogenated air-blown castor oil.

10. A fusible impregnating and coating composition which is substantially solid at room temperature and which is resistant to the solvent action of hydrocarbons, which comprises a blend of methyl 12-hydroxystearate and 5 to 50% by weight, based on the total mixture, of a non-hydrogenated air-blown soybean oil.

11. A fusible impregnating and coating composition which is substantially solid at room temperature and which is resistant to the solvent action of hydrocarbons, which comprises a blend of octadecyl 12-hydroxystearate and 5 to 50% by weight, based on the total mixture, of a non-hydrogenated air-blown castor oil.

LOUIS JOHN JUBANOWSKY.

REFERENCES CITED

The following references are of record in the file of this patent:

UNITED STATES PATENTS

| Number | Name | Date |
|---|---|---|
| 1,390,691 | Ellis | Sept. 13, 1921 |
| 1,973,998 | Schlack | Sept. 18, 1934 |
| 2,027,390 | Lazier | Jan. 14, 1936 |
| 2,082,278 | Ferguson | June 1, 1937 |
| 2,217,723 | Benoit | Oct. 15, 1940 |
| 2,251,225 | Dangelmajer | July 29, 1941 |
| 2,303,600 | Benoit et al. | Dec. 1, 1942 |
| 2,327,450 | Parker | Aug. 24, 1943 |
| 2,360,246 | McNally | Oct. 10, 1944 |